United States Patent
Langner et al.

(10) Patent No.: US 10,036,839 B2
(45) Date of Patent: Jul. 31, 2018

(54) DIRECTION-SELECTIVE INTERFEROMETRIC OPTICAL FILTER

(71) Applicant: TECHNISCHE UNIVERSITÄT DRESDEN, Dresden (DE)

(72) Inventors: Maik Langner, Dresden (DE); Hartmut Fröb, Glashütte (DE); Vadim G. Lyssenko, Dresden (DE); Markas Sudzius, Dresden (DE); Karl Leo, Dresden (DE)

(73) Assignee: TECHNISCHE UNIVERSITÄT DRESDEN, Dresden (DE)

( * ) Notice: Subject to any disclaimer, the term of this patent is extended or adjusted under 35 U.S.C. 154(b) by 0 days.

(21) Appl. No.: 15/517,213

(22) PCT Filed: Oct. 7, 2015

(86) PCT No.: PCT/DE2015/000502
§ 371 (c)(1),
(2) Date: May 16, 2017

(87) PCT Pub. No.: WO2016/055046
PCT Pub. Date: Apr. 14, 2016

(65) Prior Publication Data
US 2017/0276849 A1    Sep. 28, 2017

(30) Foreign Application Priority Data
Oct. 7, 2014   (DE) ................. 10 2014 014 980

(51) Int. Cl.
*G01J 5/28*    (2006.01)
*G02B 5/28*    (2006.01)
(Continued)

(52) U.S. Cl.
CPC ............... *G02B 5/288* (2013.01); *G01J 3/26* (2013.01); *G02B 1/005* (2013.01); *G02B 5/284* (2013.01); *G02B 26/001* (2013.01)

(58) Field of Classification Search
CPC .......... G01J 3/26; G01J 3/0289; G01J 3/0256; G01J 3/28; G01J 2003/1234; G02B 5/288
See application file for complete search history.

(56) References Cited

U.S. PATENT DOCUMENTS

| 4,395,769 A | * | 7/1983 | Damen | ................ | H01S 5/041 |
| | | | | | 372/20 |
| 5,218,473 A | * | 6/1993 | Seddon | ................ | G01J 3/26 |
| | | | | | 359/580 |

(Continued)

FOREIGN PATENT DOCUMENTS

DE     102005042952 B3    4/2007

OTHER PUBLICATIONS

International Search Report issued in PCT/DE2015/000502, dated Feb. 9, 2016.

(Continued)

*Primary Examiner* — Hwa Lee
(74) *Attorney, Agent, or Firm* — Heslin Rothenberg Farley & Mesiti P.C.

(57) ABSTRACT

A direction-selective interferometric optical filter for spectrometric devices, at least includes an arrangement of two layered one-dimensional photonic structures. Each of the two structures contains a defect layer, and each photonic structure has a dispersion function in the energy momentum space (E, kx, ky), wherein kx and ky are momentum components of transmitted photons of the photonic structures for a defined energy (frequency/wavelength) E in the energy momentum space. Both photonic structures have opposite interfaces which are at a plane-parallel distance from one another. In this case, the dispersion functions of (Continued)

both photonic structures cross or intersect in the energy momentum space and produce a cut set of rays of waves on the surfaces of the dispersion functions at a particular energy, wherein a ray of waves contains waves selectively chosen through the filter at an angle, while other waves are reflected by the filter at other angles.

15 Claims, 8 Drawing Sheets

(51) Int. Cl.
    *G01J 3/26*      (2006.01)
    *G02B 26/00*      (2006.01)
    *G02B 1/00*      (2006.01)

(56) References Cited

U.S. PATENT DOCUMENTS

| | | |
|---|---|---|
| 5,719,989 A | 2/1998 | Cushing |
| 6,115,401 A | 9/2000 | Scobey et al. |
| 6,130,780 A | 10/2000 | Joannopoulos et al. |
| 6,624,945 B2 | 9/2003 | Fan et al. |
| 6,859,321 B2 | 2/2005 | Kimerling et al. |
| 7,310,454 B2 | 12/2007 | Akiyama et al. |
| 2002/0135853 A1* | 9/2002 | Scalora ............... B82Y 20/00 359/248 |
| 2007/0081156 A1 | 4/2007 | Treado et al. |
| 2008/0285165 A1* | 11/2008 | Wu ........................ G01J 3/02 359/885 |
| 2013/0279006 A1 | 10/2013 | Song et al. |

OTHER PUBLICATIONS

Panzarini et al., "Polariton dispersion and polarisation splitting for quantum well excitons in single and coupled microcavities," Physica Status Solidi A, 164:91-94 (1997).

* cited by examiner

DIRECTION-SELECTIVE INTERFEROMETRIC OPTICAL FILTER

CROSS REFERENCE TO RELATED APPLICATIONS

This application is the National Phase filing under 35 U.S.C. § 371 of International Application No. PCT/DE2015/000502, filed on Oct. 7, 2015, and published on Apr. 14, 2016, as WO 2016/055046 A1, and claims priority to German Application No. 102014014980.3, filed on Oct. 7, 2014. The contents of each of the prior applications are hereby incorporated by reference herein in their entirety.

The invention relates to a direction-selective interferometric optical filter for spectrometric devices, also designated in the following as a directional interferometric optical filter—or DIOF.

PRIOR ART

Material systems that restrict the angle of the light propagation have a plurality of applications including: natural-effect lighting, protection of privacy (displays), automatic image analysis, detectors and corresponding light sources, etc.
Previous solutions are complex in design (e.g.: photonic 3D structures) or have inadequate properties (visual privacy films: angular range of ~30°, line structure visible).

In general, such optical properties may be realised by real three-dimensional optical structures that have a band-gap for a specific direction of propagation and have at least one discrete mode in said band. In such systems a number of discrete modes typically exist in the momentum space. In addition to the fact that the manufacture of such structures is technically very demanding and uneconomical, the discretization of the modes in the momentum space restricts the possible applications.

U.S. Pat. No. 6,130,780 A1 discloses an omnidirectional reflector, comprising a structure having a surface and a variation of its refractive index along the direction normal to the said surface and a method for its production.

The optical band structure induced as result of the described multi-layer structure, given an appropriate choice of materials and of the specific layer structure, means that a frequency range exists in which photons undergo almost 100% reflection at any angle of incidence independently of their polarization.

A disadvantage of the device described in U.S. Pat. No. 6,130,780 A1 however, is that there is no facility to define (direction as well as frequency of light) a narrow band within the reflected frequency range or band which is allowed to pass through.

The electromagnetic wavelength filter described in U.S. Pat. No. 6,624,945 B2 allows the transmission of electromagnetic energy within a narrow wavelength range, while reflecting the incident electromagnetic energy of other adjacent wavelengths, wherein the said filter comprises at least one cavity region as a defect, namely a layer thickness variation within a periodically structured layer stack which is embedded between at least two reflectors, wherein at least one layer stack can be implemented in accordance with the application U.S. Pat. No. 6,130,780 A1.

The disadvantage of this filter is the lack of direction restriction for the transmission of a fixed defined narrow wavelength range, i.e. at each angle of incidence there is a separate transmission range satisfying the dispersion condition of the filter. As a result, with the identical operating principle a pre-filtering of the wavelength or the direction can take place.

A further facility for using layer stacks of dielectric materials for filtering different wavelengths is specified in document U.S. Pat. No. 7,310,454 B2. in this case two photonic crystals are placed around a so-called defect layer (equivalent to cavity region/fault) as reflectors. The photonic crystals are produced by materials of alternating high and low refractive index, whose optical layer thicknesses $d_i = Nn_1$ are in each case generally equal to ¼ of the design wavelength. In the above expression, $d_i$ is the physical layer thickness of the respective layer and $n_i$ the refractive index thereof. The design wavelength defines the desired operating point of the device, i.e. for example, the region of maximum reflection or transmission.

In the device presented in U.S. Pat. No. 7,810,454 B2, in one embodiment a variable, switchable filter is presented, with vertical coupling via an optical fibre. To achieve this the defect layer is formed of a material which is controllable by electrical or similar means. The transmission mode, i.e. the narrow wavelength range which the filter structure can pass virtually unimpeded within the maximally reflective optical stop band, can thereby be shifted within certain limits within the electromagnetic spectrum. Given prior restriction of the possible wavelength range and the direction (via the optical fibre), an electrically controllable optical switch can therefore be produced. In a further design, a composite signal of discretely defined wavelengths is decomposed into its components using a system of differently designed filters.

Common to all of these designs is the fact that a pre-selection of the signal to be filtered must be made regarding the direction or the wavelength.

In addition, documents exist such as U.S. Pat. No. 5,719,989 A, that describe an ideal layer structure of an optical filter formed of dielectric layers, which provides a maximally uniform transmission level in a broad wavelength range. These require a large number of layers (up to several 100), which must be applied with a high degree of precision. In addition to the broad spectral transmission range, this structure as expected does not implement any direction restriction.

As a defect layer, the device described in U.S. Pat. No. 6,859,321 B2 uses an air layer between the two reflectors, which are designed as photonic crystals. Since the two reflectors are each applied on one side of a kind of plate capacitor, the distance between them can be varied by electrostatic attraction. Since the distance is several within the reflected wavelength range there is a whole series of transmitted modes. In addition, the direction restriction is removed.

In patent DE 10 2005 042 952 B3 a microresonator is used, i.e. a structure composed of two reflectors and a defect layer for producing intensity modulations of radiation with frequencies in the THz range. The use of dielectric layer stacks in this device allows a cost-effective production and the monolithic design allows a compact and robust optical element. The intensity modulation is produced by optical anisotropy within the defect layer.

Finally, U.S. Pat. No. 6,115,401 A describes the use of a filter element composed of dielectric layer stacks for filtering resonant modes in an external laser resonator. In this case the filter is applied on a prism and used in a variably adjustable (lateral/angular) position in the radiation beam. Here also, the generally applicable dispersion properties of a micro-cavity are used, to the extent that either an angle is specified at a given wavelength within the reflected wavelength range or else the transmitted wavelength is specified at a given angle, but not a combination of both.

OBJECT OF THE INVENTION

The object of the invention is to specify a direction-selective interferometric optical filter, which is suitably designed in such a way that it represents a compact filter that can be simply produced in larger quantities, which depending on the specific structure selected, totally reflects a light signal of a broad spectral band (several 100 nm) and only allows a narrow (2 nm to 5 nm) spectral wavelength range to pass within a set restricted angular range (5° to 10°). In the case of a point-shaped light source, depending on the design of the filter selected the transmitted wavelength range describes a conical surface in space with a precisely defined opening angle, up to the limiting case of 0°.

DESCRIPTION

The object of the invention is achieved by a direction-selective interferometric optical filter, which comprises at least an arrangement of two layered one-dimensional photonical structures, wherein each of the two structures contains a defect layer, where each photonic structure contains a dispersion function f1, f2 in the energy momentum space E, $k_x$, $k_y$, where $k_x$ and $k_y$ are the momentum components of transmitted photons of the photonic structures for a defined energy E in the energy momentum space E, $k_x$, $k_y$, wherein both photonic structures have opposite interfaces which are at a plane-parallel distance from one another, wherein the dispersion functions f1, f2 of both photonic structures cross or intersect in the energy momentum space E, $k_x$, $k_y$, and produce a cut set A of light rays of waves on the surfaces of the dispersion functions f1, f2 at a particular energy (E), wherein a light ray from the cut set A of waves contains waves at one angle selectively chosen through the filter, while other waves at other angles are reflected by the filter.

In the plane parallel gap between the opposite interfaces, a spacer or medium can be optionally located, e.g. in the form of an air space or air cushion which adjoin the interfaces of the photonic structures. The plane parallel gap between the interfaces in the case of a gaseous medium can be produced, e.g., using spacers.

The filter according to the invention can comprise two layered one-dimensional photonic structures, wherein the two structures each have at least two reflective layers and wherein the two mirror layers of a photonic structure are connected to each other by at least one defect layer and a spacer or medium, which connects the two photonic structures in a plane parallel manner at a fixed distance apart and coherently decouples them, wherein the dispersion parabolas induced by the two photonic structures for resonant modes in general satisfy $$k_{x36}^2+k_{y36}^2=\text{cons}\_1. \text{ and } k_{x37}^2+k_{y37}^2=\text{const}\_2.,$$

wherein the functions $k_{x36}^2+k_{y36}^2=\text{const}\_1.$ and $k_{x37}^2+k_{y37}^2=\text{const}\_2$ for a selected energy yield an intersection region A of the paraboloid regions—an angular intersection region 26 (equivalent to const_1=const_2), in which a beam path A for waves incident under an angle comprises waves that are direction-selectively transmitted through the filter.

Within the context of the invention, the direction-selective interferometric optical filter according to the invention denotes an integral component/device which enables, from a broadband continuum of electromagnetic radiation within the UV/VIS to IR-range, a narrow band of several nm to be selected, which if incident within a narrow angular range of 5°-10° the component can pass virtually unimpeded, while the rest of the spectrum is omni-directionally almost totally reflected.

The operating principle used is interferometric, i.e. the optical properties (transmission/reflection, phase behaviour) of the device arise from the multiple superposition of partial waves and their mutual partial cancellation and amplification.

According to the invention, photonic structures denote an arrangement of materials, meta-materials or micro-structures that interact with photons and are usually regular at least in some sections, or else comprise a spatial or geometric periodicity. These can occur naturally (e.g.: butterfly wings) or be artificially produced (e.g.: anti-reflection layers for eyeglasses). A typical feature of them is the variation of a property (e.g.: opt. refractive index) along at least one spatial direction of the same order of magnitude as the wavelength of light, i.e. several 10 nm to several 100 nm.

Since due to the regularity/periodicity an analogy can be made to the treatment of crystal structures in solid state theory, photonic structures are also designated by the term photonic crystals. The dimensionality of these identifies the number of spatial directions that possess photonically effective variations, i.e. a one-dimensional photonic crystal only undergoes a refractive index change in one spatial direction (e.g. upwards), while the other two spatial directions (in the plane) show no variation.

Layered structures within the context of the invention denote a sequence of material layers (e.g.: metal oxides, metals, polymers, organic molecules, etc.) connected to one another, which each have a surface area of several mm² up to several 100 cm² and a constant thickness of an order of magnitude of less than 10 nm to several 100 nm, wherein between each of two materials exactly one interface is created, the area of which deviates only slightly therefrom. The successive interfaces in a photonic structure that have more than two layers are plane parallel to one another. Due to the ratio of the sizes of their areas, the layers are also designated as films.

Manufacturing processes for these films can include all methods from the state of the art, such as vacuum sublimation, sputtering methods, centrifugal methods, and immersion methods.

A reflective mirror layer within the context of the invention represents a highly reflective photonic structure, also designated as a dielectric mirror, in which due to interference effects a high proportion of radiation (almost 100%) within a broad spectral band (several 10 nm-several 100 nm) is totally reflected. In contrast to metallic mirrors, the efficiency is nearly 100%, because usually no, or almost no, radiation is absorbed. A simply designed dielectric mirror consists of an alternating sequence of layers composed of materials which are transparent for the relevant wavelength range, and which differ from each other in their respective refractive index. In the visible spectrum these are, for example, the materials silicon dioxide (n_SIO2=1.46) and titanium dioxide (n_TiO2=2.4-2.6), which in each case are adjusted to an optical thickness n×d of one quarter of the maximum wavelength to be reflected. If the number of pairs of alternating layers is approximately seven to nine, reflection values of >99% can be obtained. To provide adjustments of the specific reflection behaviour in a broad spectral range of several 100 nm, additional layers or layer stacks with precisely calculated layer thickness deviations can be added.

A defect layer in the context of the invention denotes a fault within the photonic crystal. An ideal crystal has a regular, periodically recurring geometrical structure. A disruption in the periodicity is designated as a defect, and thus when transferred to a layer structure this translates into the presence of, e.g., a fault in the regular arrangement of material and/or thicknesses. This fault can be, for example, in the case of a dielectric mirror as described above, the replacement of a layer of the optical thickness of a quarter of the wavelength by one of half the wavelength.

A spacer or a medium in the context of the invention designates on the one hand solid bodies having at least two planar sides oriented plane parallel to one another, which are sufficiently transparent to the wavelength of light to be filtered, these including for example glass plates, polymer layers, semiconductor wafers or similar. On the other hand, a gaseous or liquid medium can be located between the two photonic structures, as long as these are arranged a fixed plane parallel distance apart from each other. This can be implemented, for example, by regularly inserted spacers.

In the context of the invention a dispersion parabola designates the description of the curve of the dispersion relation of photonic structures with a defect layer as described above. In general, the dispersion relation describes the relationship between the energy (frequency/wavelength) and the momentum of photons (ergo their direction). While in the case of interaction-free photons in a vacuum the graph is a linearly increasing straight line, the photonic structure with a defect layer induces a parabolic shape.

A resonant mode in the context of the invention designates a natural vibration of the photonic structure induced by the defect layer. It is expressed, for example, by a high narrow-band transmission and can be spectrally adjusted, for example, by the spatial extent and composition of the defect layer. A photonic structure can have more than one resonant mode, these being typically adjusted in the design and implementation of the structure such that they are located at the centre of the spectral band which the dielectric mirrors totally reflect.

For each viewing direction below the conditions for total internal reflection at an interface layer, a resonant mode is shifted up to higher energies according to the dispersion relation.

An intersection region of parabolic regions within the context of the invention arises due to the fact that the dispersion functions f2 of the second photonic structure and f1 of the first photonic structure are configured in such a way that f2 describes a more open parabola in the energy momentum space $E-k_x-k_y$, the vertex of which is energetically higher than the vertex of f1 or coincides therewith. The distance must be selected such that the intersection region of the momentum components of the photons still lies below the conditions for total internal reflection. In the limiting case of the co-incidence of vertex f1 with vertex f2, it follows that both photonic structures transmit normally incident light, but obliquely incident light does not satisfy either condition f1 or f2, and is therefore reflected.

If the medium is designed as a layer-like spacer layer, the spacer layer is arranged between the opposite interface layers of the two photonic structures that are applied on the two opposite surfaces of the layer-like spacer piece.

At least one substrate can be present, which is in areal contact with at least one of the photonic structures.

The spacer can also represent a layer.

The layered one-dimensional photonic structure consists of at least two dielectric material layers arranged alternately and representing reflective dielectric mirror layers, wherein the material layers have different dielectric properties over the whole operating spectrum of the filter, wherein the thickness D of the material layers is designed in such a way that they induce an optical blocking region around a specified filter mode.

A layered one-dimensional photonic structure in the form of a photonic crystal has at least one defect layer, which results in an amplification of the specified filter mode, wherein a defect layer is located between two dielectric mirrors which are designed as a dielectric material layer with a specified refractive index.

The defect layer can have either a fixed optical thickness d or a variable optical thickness d.

The defect layers within two layered one-dimensional photonic structures can have different refractive indices.

The optical thicknesses d of defect layers within two layered one-dimensional photonic structures can have the same optical thickness d or can differ by an integer multiple of a half-wavelength or are designed with differences from these values.

The spacer or medium, as a device for forming a plane parallel gap between the two photonic structures, is optically transparent in the resonant frequency condition of the direction-selective interferometric optical filter and has an optical thickness $D_D$. The optical thickness $D_D$ controls the coupling mechanism of both photonic structures. In the event that it is significantly smaller than the coherence length of an incident light beam (LEDs: several 10 μm, lasers: mm-km) from the light source that is analysed by the filter, both photonic structures are coherently coupled and act as a single complex photonic system. This typically results in a doubly degenerate DIOF mode and widens the spectral and direction-dependent resonance. This reduces the filter effect of the system considerably. If the optical thickness $D_D$ is greater than the coherence length of the incident light beam, satisfying the resonance conditions of both photonic structures, the two photonic structures are decoupled from one another and act as two independent systems. For the simulations and measurement results shown, the latter case is assumed.

The spacer/medium can have mechanical properties that ensure a specified mode of operation of the filter, wherein the spacer is installed as a transparent substrate for both photonic structures, which are each attached to both sides of the surface of the spacer.

The substrate/medium is optically transparent in the resonant frequency condition of the specified filter mode, at/according to which the direction-selective interferometric optical filter can be produced or attached.

A device having the direction-selective interferometric optical filter includes at least one light source and a detector, between which the direction-selective interferometric optical filter is arranged, wherein the direction-selective interferometric optical filter is designed in such a way that there are resonant photonic waves for the filter in a matching propagation direction before the interaction with the filter, resonant photonic waves for the filter in a matching propagation direction after the interaction with the filter, non-resonant photonic waves for the filter in a matching propagation direction before the interaction with the filter, non-resonant photonic waves for the filter in a matching propagation direction after the interaction with the filter, resonant photonic waves for the filter in a non-matching propagation direction before the interaction with the filter and resonant photonic waves for the filter in a non-matching propagation direction after the interaction with the filter.

The central idea is the exploitation of interferometric effects of at least two photonic structures in the form of photonic crystals that are connected via a substrate acting as a spacer. This procedure exploits the fact that a photonic crystal has a transparent wavelength band (mode) with a direction-dependent transmission curve (dispersion), the shape of which depends on both the specific structure and also on the materials and their optical properties. If photonic crystals with different dispersion relations are now combined, then by mutual cancellation of the transmitted signal in the case of non-correspondence/absence of overlap of the two dispersion relations, it is possible for to make the filter transparent only in a narrow angular range and in a narrow wavelength range, i.e. at the point of intersection of the dispersion curves. All other directions and spectral ranges are reflected back in the direction of the emitting light source.

A detector device when using the filter according to the invention can consist of at least a large-area photodetector and the filter according to the invention, wherein the filter is mounted either directly on the surface of the photodetector or else fixed on the photodetector, and the filter is located between a photon-emitting medium and the photodetector.

The photonic structures are designed in such a way that they have similar angle-dependent dispersion relations, while at the same time having different propagation velocities in the plane perpendicular to the filter normal. The cutoff frequency of both photonic structures (the lowest resonant frequency of the system) is defined by the thickness of the defect layer and its refractive index. On the other hand, the propagation of the direction component in the plane depends on the amplitude of the phase delay in the environment of the defect layer. This can be controlled by the precise choice of the optical layer structure and the selection of the materials.

This means that the filter behaves as an actual three-dimensional photonic structure, although there are no structures in the plane and nor is there any additional amplification of the electromagnetic field in the inside.

BRIEF DESCRIPTION OF THE DRAWING FIGURES

The invention is now described in further detail by reference to exemplary embodiments and with the aid of a number of drawings.

Shown are:

FIG. 1 a schematic view of the operating principle of a direction-selective interferometric optical filter according to the invention, FIG. 2 a schematic side view of the direction-selective interferometric optical filter according to the invention, FIG. 3 illustrations in accordance with FIG. 3a of the relationship between different regions of an angular dispersion and in accordance with FIG. 3b of beam paths in a filter in a general case, when the dispersion dependencies (dispersion functions f1, f2) of one-dimensional photonic structures are given by $k_x^2 + k_y^2 = \text{const.}$, FIG. 4 illustrations in accordance with FIG. 4a of the relationship between the different regions of the angular dispersion and in accordance with FIG. 4b of beam paths in a filter with a special case, when the dispersion dependencies of two one-dimensional photonic structures are given by $k_x^2 + k_y^2 = 0$, FIG. 5 a calculated transmission curve of the direction-selective interferometric optical filter for polarized light as a function of the photon energy and the propagation angle in air, wherein the direction-selective interferometric optical filter is designed in such a way that its resonance mode is located at the centre of the photonic blocking range of the mirror and has a restricted acceptance angle of 12 degrees, FIG. 6 a calculated transmission curve of the direction-selective interferometric optical filter for polarized light as a function of the photon energy and the propagation angle in air, wherein the direction-selective interferometric optical filter is designed in such a way that its resonance mode is located at approximately forty degrees and has an acceptance angle range of twelve degrees, FIG. 7 a representation of an angle-resolved spectral function, which is measured with $SiO_2/TiO_2$ structures and is based on the filter, wherein—the filter is designed in such a way that it exhibits a resonance transmission maximum at twenty-five degrees with an acceptance angle of ten degrees and at all other angles is strongly attenuated, and FIG. 8 a representation of an angle-resolved spectral function, which is measured with $SiO_2/TiO_2$ structures and is based on the filter, wherein the filter is designed in such a way that it exhibits a resonance transmission maximum about zero degrees with an acceptance angle of twenty degrees and at higher angles is strongly attenuated.

DETAILED DESCRIPTION

Hereafter, FIG. 1, FIGS. 2 and 3 will be described together.

Figure 1:
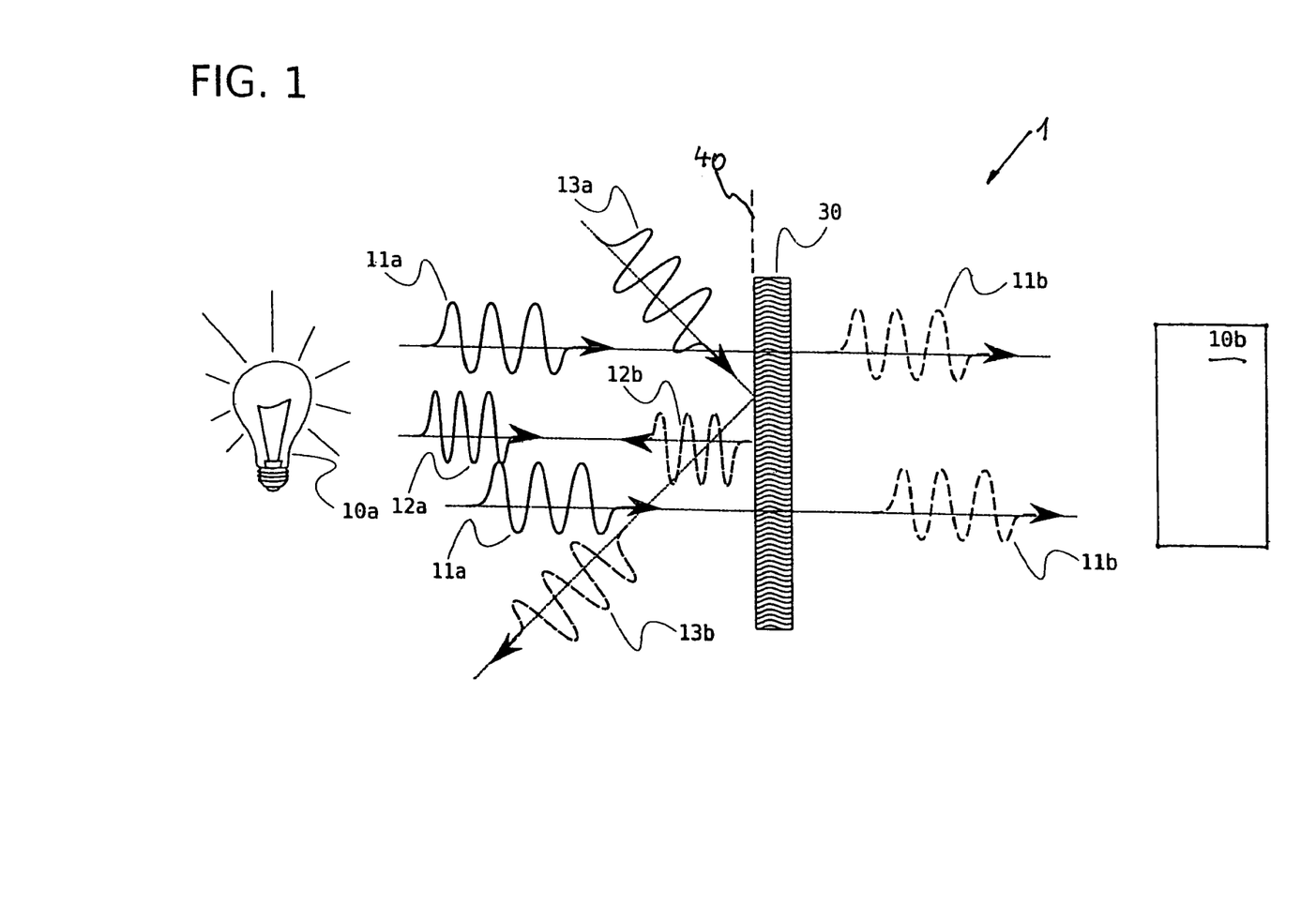

FIG. 1 shows in an exemplary embodiment according to the invention a direction-selective interferometric optical filter 30, e.g. for a spectrometric device 1, the operating principle of which is shown schematically is FIG. 1. The direction-selective interferometric optical filter 30 for spectrometric devices comprises at least an arrangement of two layered one-dimensional photonic structures 36, 37; 25a, 25b, wherein each of the two structures 36, 37; 25a, 25b contains a defect layer 32, 34, wherein each photonic structure 36, 37; 25a, 25b has a dispersion function f1, f2 in the energy momentum space E, $k_x$, $k_y$ shown in FIG. 3, wherein $k_x$ and $k_y$ represent the momentum components of transmitted photons of the photonic structures 36, 37, 25a, 25b for a particular energy (frequency/wavelength) E in the energy momentum space E, $k_x$, $k_y$, wherein both photonic structures 36, 37; 25a, 25b comprise opposite interfaces 42, 43, which are spaced a plane parallel distance $D_D$ apart from each other.

Figure 3A:
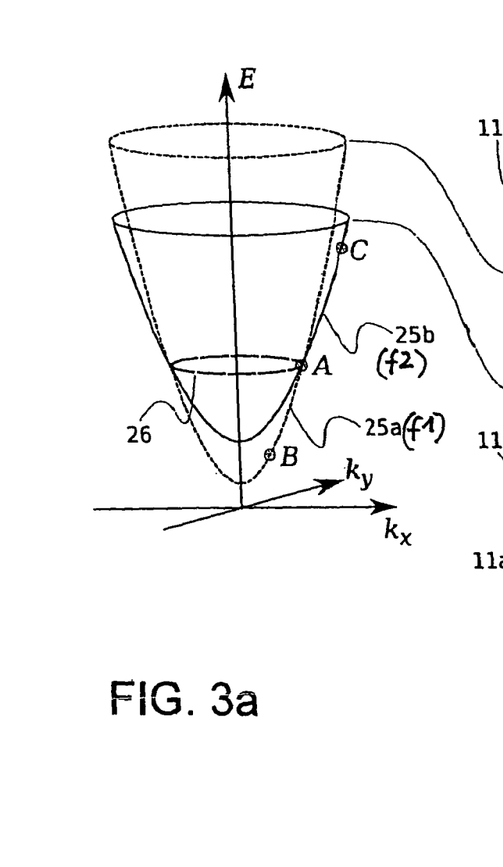
Figure 3B:
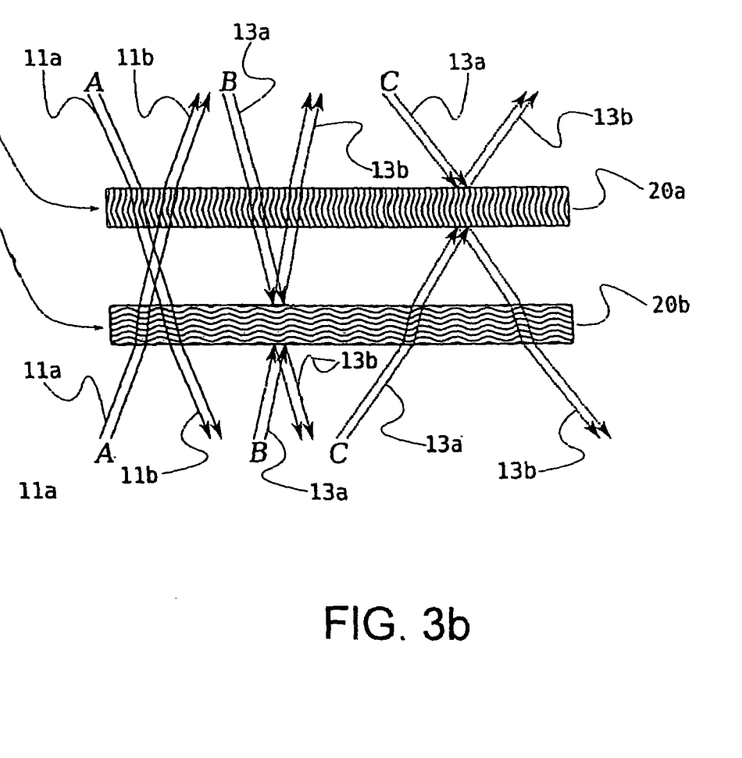

According to the invention the dispersion functions f1, f2 of both photonic structures 36, 37; 25a, 25b shown in FIG. 3 cross or intersect in the energy momentum space (E, $k_x$, $k_y$), producing a cut set A of light rays of waves on the surfaces of the dispersion functions f1, f2 at a particular energy E, wherein a light ray from the cut set A of waves at one angle contains waves 11a, 11b selectively chosen through the filter 30, while other waves 13a, 13b at other angles are reflected by the filter 30.

The device 1 shown in FIG. 1 having the direction-selective interferometric optical filter 30 includes a light source 10a and a detector 10b, between which at least the direction-selective interferometric optical filter 30 is arranged 30.

The direction-selective interferometric optical filter 30 is designed in such a way that there are resonant photonic waves 11a for the filter in a matching propagation direction before the interaction with the filter 30, resonant photonic waves 11b for the filter in a matching propagation direction after the interaction with the filter 30, non-resonant photonic waves 12a for the filter in a matching propagation direction before the interaction with the filter 30, non-resonant photonic waves 12b for the filter in a matching propagation direction after the interaction with the filter 30, resonant photonic waves 13a for the filter in a non-matching propagation direction before the interaction with the filter 30 and resonant photonic waves 13b for the filter in a non-matching propagation direction after the interaction with the filter 30.

Only the photon beam 11a from the light source 10a which is incident normally on the filter 30, charged with specific energy and provided with a specified direction of propagation, is allowed to pass through the filter 30. All other photon beams, even those photon beams 13a that have the same energy as the transmitted photon beams 11a, but propagate in a different direction inclined to the entry surface 40, are reflected back by the filter 30 as waves 13b in the direction of the light source 10a.

Figure 2:
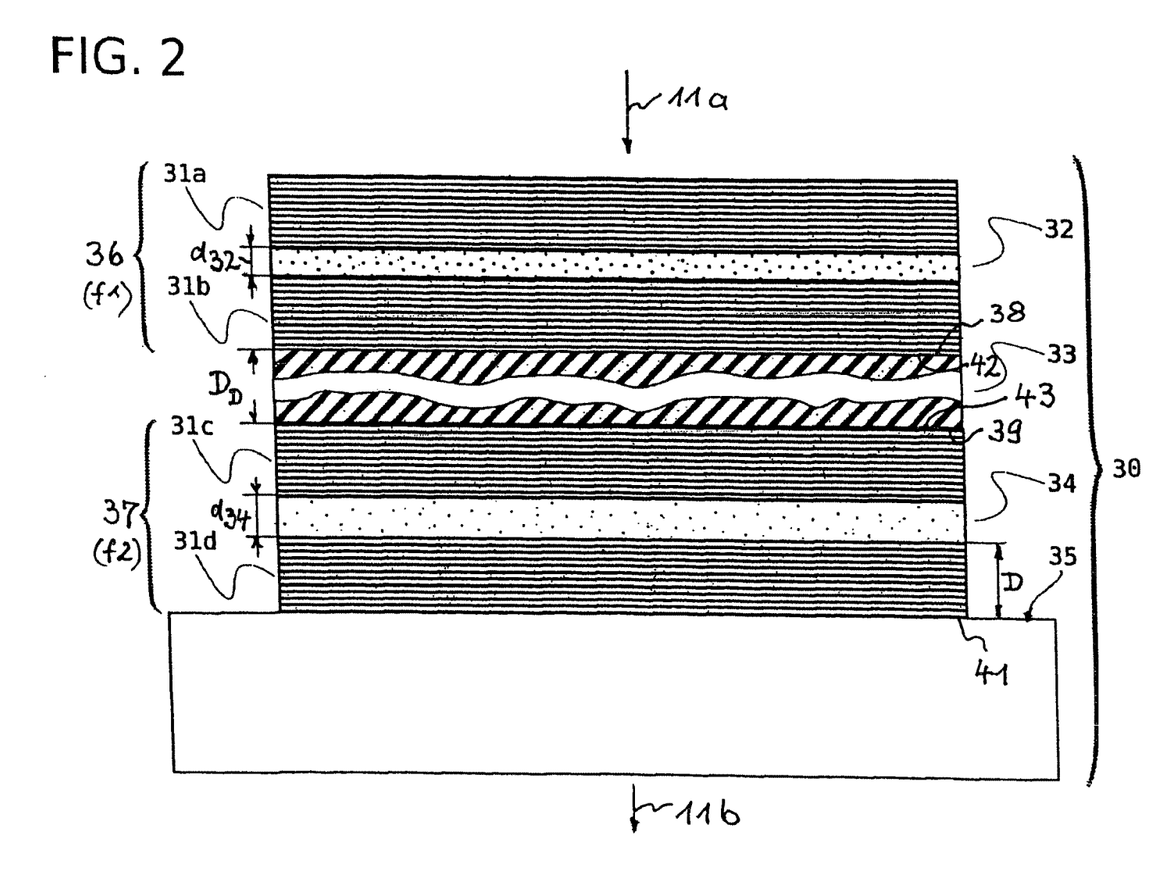

An example structure of the filter 30 according to the invention is shown schematically in FIG. 2.

The direction-selective interferometric optical filter 30 in FIG. 2 comprises at least an arrangement of two layered one-dimensional photonic structures 36, 37, wherein one structure 36 contains at least two reflective mirror layers 31a, 31b and the other structure 37 contains at least two reflective mirrors 31c, 31d, a layer-shaped spacer piece 33 having a thickness 33 equal to the distance $D_D$ for connecting the two photonic structures 36, 37, which are adjacent to the opposite sides of the surface 38, 39 of the spacer piece 33 connecting them together.

Alternatively, a substrate 35, which is in direct contact with the outer surface 41 of the photonic structure 37, can be applied.

FIG. 2 therefore shows a layered one-dimensional photonic structure 36, 37 consisting of at least two layers 31a, 31b; 31c, 31d arranged alternately and representing reflective dielectric mirrors, wherein between the mirror layers 31a and 31b and between the mirror layers 31c and 31d one defect layer 32, 34 is arranged in each case, wherein the mirror layers 31a, 31b and the mirror layers 31c, 31d have different dielectric properties with a different refractive index over the whole operating spectrum of the filter 30, and wherein the thickness D of the mirror layers 31a, 31b are designed in such a way that they induce an enlargement of a blocking region 52 around a specified filter mode 60.

The layered one-dimensional photonic structures 36, 37 shown in FIG. 2 have the defect layer 32; 34, which results in an amplification of the specified filter mode 60, wherein one defect layer 32, 34 is located in each case between the two dielectric mirror layers 31a, 31b and 31c, 31d, wherein the mirror layers 31a, 31b and 31c, 31d are in each case designed as a dielectric material layer with a specified refractive index.

The defect layer 32, 34 can have either a fixed optical thickness d or a variable optical thickness d.

The defect layers 32, 34 that are used within the two layered one-dimensional photonic structures 36, 37 can have different refractive indices.

The optical thicknesses d of defect layers 32, 34 within two layered one-dimensional photonic structures 36, 37 can have the same optical thickness or can differ by an integer multiple of half-wavelengths or be designed with values different (by a few percent) from these. In FIG. 2, e.g. the defect layers 32 and 34 each have different thicknesses $d_{32}$ and $d_{34}$.

The spacer 33 between the two photonic structures 36, 37 is optically transparent in the resonant frequency condition of the filter 30, and can have an optical thickness $D_D$ larger than the coherence length of the incident light beam 11a from the light source 10a that is analysed by the filter 30.

The substrate 35 is optically transparent in the resonant frequency condition of the specified filter mode 60, at/according to which the direction-selective interferometric optical filter 30 is produced or is attached. The substrate 35 is not absolutely necessary, but can function as a stabilizing support for the filter 30.

The spacer 33 has mechanical properties that ensure a specified operating mode of the filter 30, and is installed as a transparent substrate for both photonic structures 36, 37, which are each attached to both sides 38, 39 of the surface of the spacer 33.

Figure 4A:
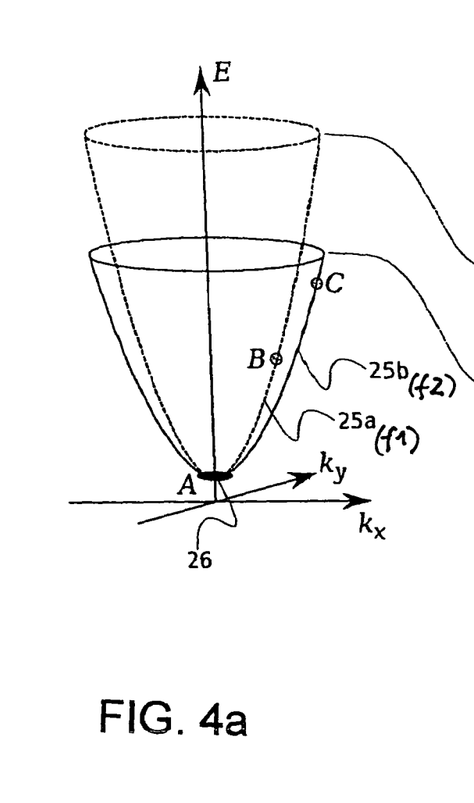
Figure 4B:
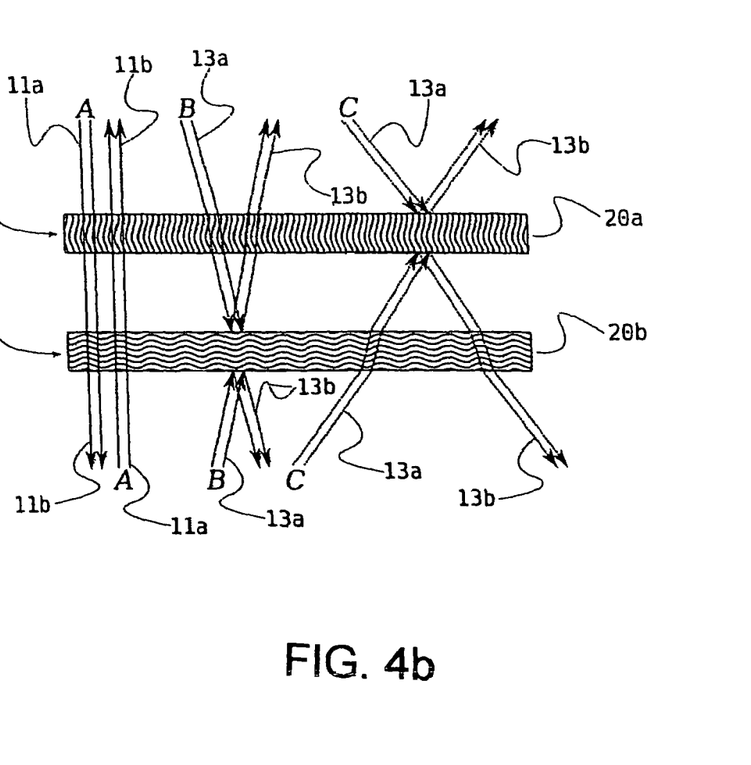

In the following the operating principle is explained in more detail: in order to realize the filter 30, an arrangement of photonic structures 36, 37 in the form of two large-area one-dimensional photonic crystals is used, both containing a defect layer 32, 34, each of which can be represented by a vacancy layer. In both structures 36, 37 the electromagnetic field E in accordance with FIGS. 3 and 4 is attenuated along a spatial direction normal to the mirror layers 31a, 31b and 31c, 31d and the fundamental specified filter mode 60 is the beginning of the continuum of the photon mode with a dispersion in the plane of the vacancies.

Nevertheless, depending on the particular arrangement of the one-dimensional photonic crystals 36, 37, the corresponding internal plane-propagation vectors can exhibit other behaviour than a function of an external propagation angle, and lead to different dispersion conditions with regard to the fundamental filter mode 60. As a result, if the light propagates through an arrangement of two such parallel arranged photonic structures 36, 37, the dispersion relation for the said arrangement becomes discrete and restricts the adjustment to a specific angle. In this sense, such an arrangement simply behaves exactly like an actual 3D-restricted optical arrangement, although it does not have an actual inner surface of an optical limiter and does not give rise to an additional increase of an internal electromagnetic field E. But such a quasi 3D-restricted, one-dimensional arrangement has a very clear and identifiable advantage compared with the real 3D-photonic crystal. Large areas of quasi-3D photonic filters are simple to produce in such a way that the photonic structures 36, 37 can only be controlled via one dimension—the shortest in the arrangement.

FIG. 3 shows illustrations in accordance with FIG. 3a of the relationship between different parabolic regions 25a and 25b of an angular dispersion of beam paths, and in accordance with FIG. 3b of beam paths A, B, C in the filter 30 in a general case, when the dispersion dependencies (dispersion functions f, f2) of one-dimensional photonic structures 36, 37 are given by $k_x^2 + k_y^2 = \text{const}$.

In the above, $k_x$ and $k_y$ are the momentum components of the photons in the plane.

In the intersection region A of the paraboloid regions 25a and 25b an angular intersection region 26 is obtained, in which for waves 11a incident at one angle the beam path A has waves 11b passed through the filter 30.

The intersection region A of parabolic regions within the context of the invention arises due to the fact that the two dispersion functions f2 shown in FIG. 3 of the second photonic structure (crystal) 25b and f1 of the first photonic structure (crystal) are configured in such a way that f2 describes a more open parabola in the energy momentum space E, $k_x$, $k_y$, the vertex of which is energetically higher than the vertex of f1 or coincides therewith. The distance must be selected such that the intersection region of the momentum components of the photons still lies below the conditions for total internal reflection. In the limiting case of the co-incidence of vertex f1 with vertex f2, it follows that both photonic structures (crystals) transmit normally incident light, but obliquely incident light either does not satisfy condition f1 or f2, and is therefore reflected.

FIG. 4 shows illustrations in accordance with FIG. 4a of the relationship between the different regions of the angular dispersion and in accordance with FIG. 4b of beam paths A, B, C in the filter 30 in a special case, when the dispersion dependencies of the two one-dimensional photonic structures are given by $k_x^2 + k_y^2 = 0$.

In the intersection region A of the paraboloid regions 25a and 25b, an angular intersection region 26 is obtained in the area of the vertex of the paraboloid regions 25a, 25b, in which for normally incident waves 11a the beam path A has waves 11b passed through the filter 30, and represents a special case at normal incidence.

In FIG. 3 and FIG. 4 the photonic structures 36 and 37 represent crystals, wherein the first photonic structure 36 is a first large-area one-dimensional photonic crystal 20a with a first dispersion and the second photonic structure is a second large-area one-dimensional photonic crystal 20b with a second dispersion.

Figure 5:
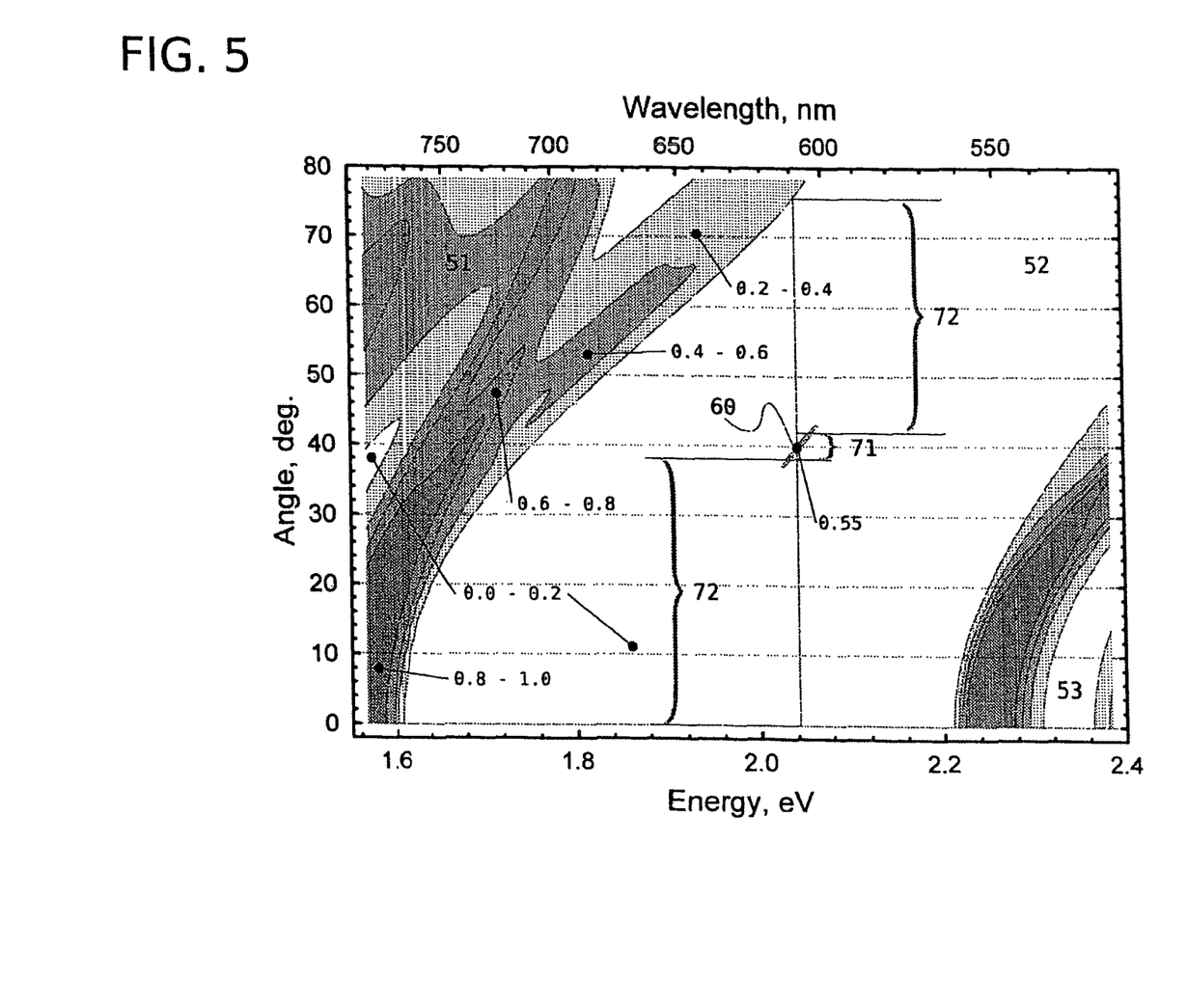

FIG. 5 shows a calculated transmission curve of the direction-selective interferometric optical filter 30 for polarized light as a function of the photon energy and the propagation angle in air, wherein the direction-selective interferometric optical filter 30 is designed in such a way that its resonance mode lies at the centre of the photonic blocking range 52 of the mirror and has a restricted acceptance angle of twelve degrees. The transfer matrix method is used for the calculation. The filters in this model consist exclusively of dielectric materials which are optically transparent in the visible spectrum. The entire DIOF structure consists of an arrangement of silicon dioxide ($SiO_2$) layers and titanium dioxide ($TiO_2$) layers of different thickness. In this simulation, dielectric microresonators form the one-dimensional photonic structures 36, 37 on both sides of the spacer 33, which consists of a thick $SiO_2$ layer. All mirrors are designed as DBRs, each with seven layer pairs at a design wavelength of 650 nm. The resonance layer (defect layer) consists of silicon dioxide and titanium dioxide with an optical layer thickness (at 650 nm) of $\lambda/2$ or $\lambda$.

Figure 6:
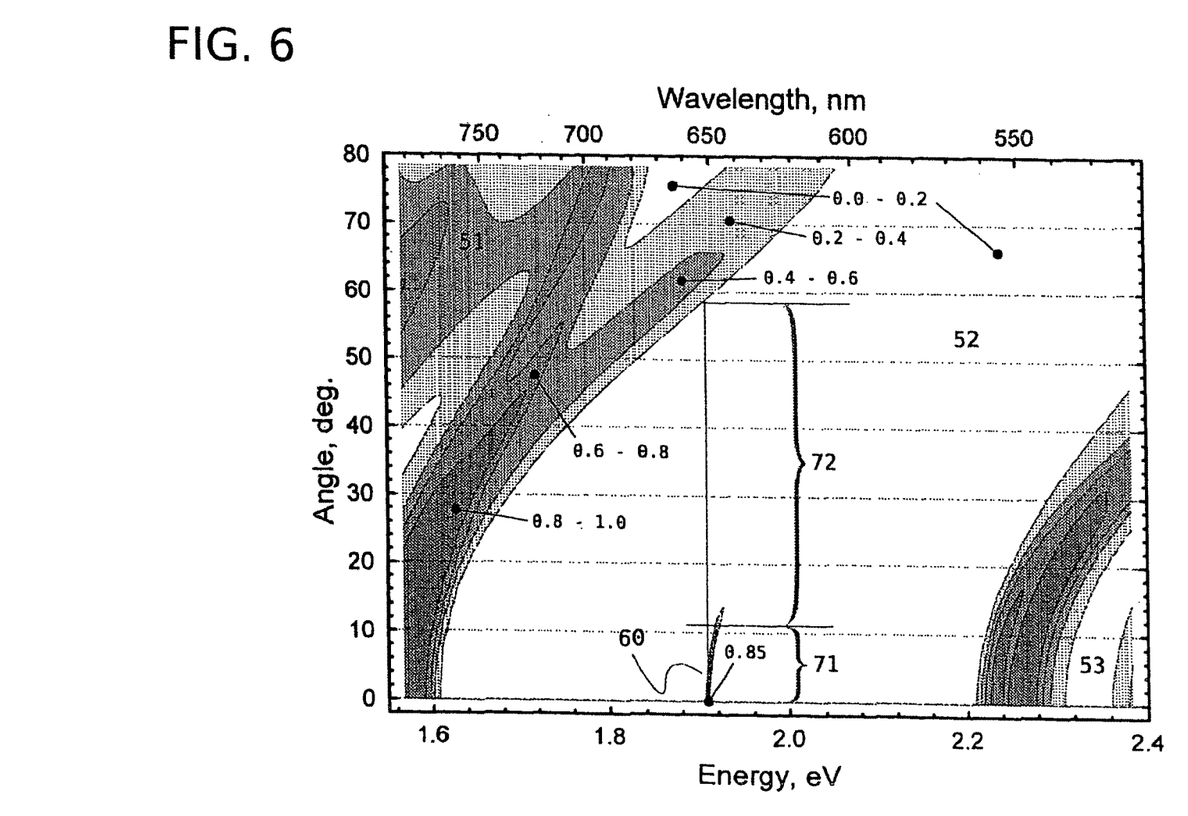

FIG. 6 also shows a calculated transmission curve of the direction-selective interferometric optical filter 30 for polarized light as a function of the photon energy and the propagation angle in air, wherein the direction-selective interferometric optical filter 30 is designed in such a way that its resonance mode is located at approximately forty degrees and has an angular acceptance range 71 of approximately four degrees. In this case the layer thicknesses of the resonance layers are 2.07 $\lambda/4$ for titanium dioxide and 1.93 $\lambda/4$ for silicon dioxide. In addition to this detuning of the cutoff frequency of both microresonators, the significantly different refractive index of both structures (~2.2 for titanium dioxide and ~1.46 for silicon dioxide at 650 nm) ensures a different curvature of the two dispersion parabolas at k>0.

FIG. 5 and FIG. 6 show the low-energy side band 51 and the high-energy side band 53. In between these is the blocking region 52. The blocking region 52 includes the angular non-acceptance range 72 and the angular acceptance range 71. The angular acceptance range 71 in FIG. 5 is approximately twelve degrees, while the angular non-acceptance range 72 in FIG. 5 is approximately forty-six degrees and in FIG. 6 the angular acceptance range 71 is approximately four degrees and the angular non-acceptance range 72 in shaped region 72a is approximately thirty-eight degrees and in the shaped region 72b approximately 33 degrees.

In FIG. 6 the acceptance range 71 of approximately four degrees is located between the two regions 72c and 72b. The acceptance range 71 also includes the filter mode 60.

Figure 7:
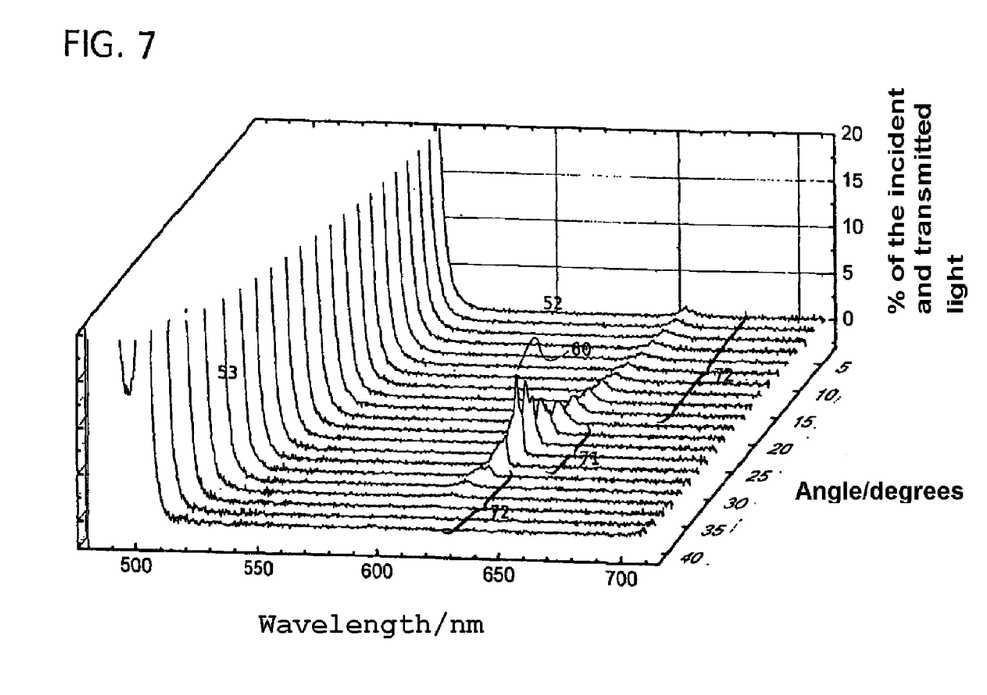
Figure 8:
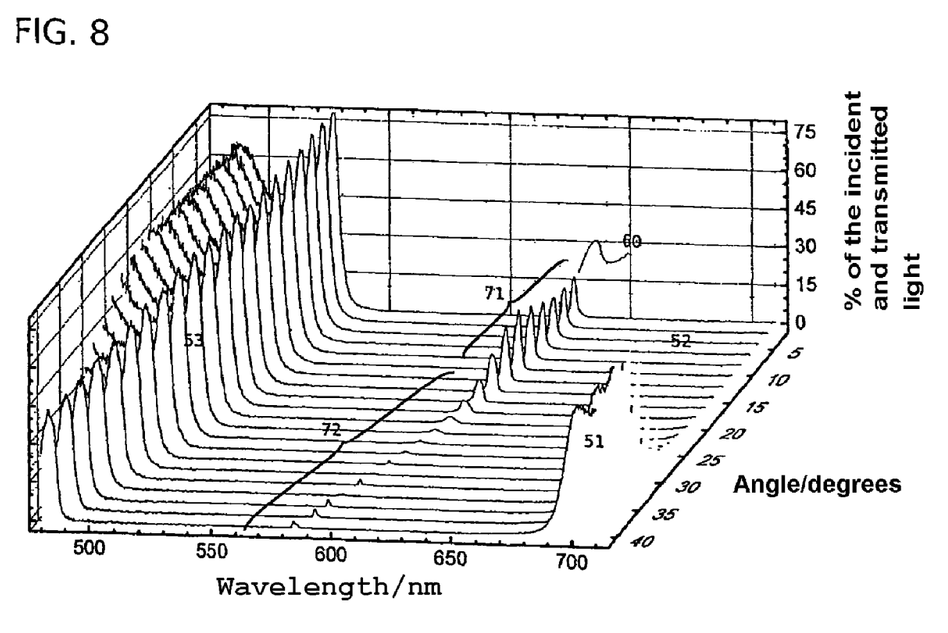

FIG. 7 shows an illustration of an angle-resolved spectral function, which is measured with $SiO_2/TiO_2$ structures 36 and 37 and is based on the filter 30 according to the invention, wherein the filter 30 is designed in such a way that it exhibits a resonance transmission maximum at approximately twenty-five degrees with an acceptance angle of ten degrees and at all other angles is strongly attenuated, FIG. 8 shows an illustration of an angle-resolved spectral function, which is measured with $SiO_2/TiO_2$ structures 36 and 37 and is based on the filter 30, wherein the filter is designed in such a way that it exhibits a resonance transmission maximum around zero degrees with an acceptance angle of twenty degrees and at higher angles is strongly attenuated.

There is a wide range of different application possibilities, which are based exclusively on the operating mode of the filter 30 according to the invention. E.g., for producing large-area filters with a small acceptance angle of the specified filter mode, it restricts the circular symmetry and can be used e.g. for controlling the large-area filter over a large angular range for the protection of privacy, for increasing the sensitivity and for error detection, which are the most common applications.

This filter has at least two large-area photonic structures. It behaves in many respects as a conventional interferometric optical filter, with the difference that in addition to the wavelength and polarization selectivity, a directional restriction is added. This means that the filter can transmit photons that satisfy a resonance condition for a restricted angular range, while it effectively suppresses the propagation under other angles. The transmission direction is axially symmetrical to the filter normal and can be precisely adjusted (actively or passively) by the design of the photonic structure. This also includes the special case that photons are only transmitted under normal incidence.

The mirrors 31a, 31b; 31c, 31d play a vitally important role for the filter 30. Strictly speaking, they must be photonic structures (e.g.: dielectric mirrors), into which light can penetrate up to a specific penetration depth and in the process undergoes a phase shift after reflection. In the two structures 36, 37, the effect on the phase of the light must be different, which leads to the different curvatures of the dispersion relations. The mirrors 31a, 31b; 31c, 31d do not have to be perfect photonic structures (e.g. lambda/4 layers for a precisely defined design wavelength). The best result for the filter effect is achieved when both photonic structures 36, 37 are different and deviate slightly from their ideal values (e.g.: exact multiples of lambda/4 or lambda/2).

The mirrors 31a, 31b; 31c, 31d are used as a special case if the filter (photonic structures and an optical spacer) 30 consists of two planar dielectric microresonators.

The curvature can be controlled by a specific interaction of the penetration depth of light into the mirrors 31a, 31b; 31c, 31d and phase shifts, if the light oscillates within the resonance layer. But at the same time this renders the dispersion property strictly speaking non-parabolic, which means that they can cross.

If the thickness $D_D$ of the spacer layer 33 is greater than the coherence length of the light, the two photonic structures 36, 37 are "coherently decoupled" and the filter 30 has only a single resonance. For example, for sunlight, with a coherence length of several m a spacer 33 of e.g. 100 µm is already sufficient for the filter 30 to operate in the "coherently decoupled" regime.

LIST OF REFERENCE NUMERALS

1 Device
10a photon-emitting medium/light source
10b photon-detecting medium/photodetector
11a filter resonant photonic waves in matching propagation direction before an interaction with the filter
11a filter resonant photonic waves in matching propagation direction after an interaction with the filter
12a filter non-resonant photonic waves in matching propagation direction before the interaction with the filter
12b filter non-resonant photonic waves in matching propagation direction after the interaction with the filter
13a filter resonant photonic waves in non-matching propagation direction before the interaction with the filter
13b filter resonant photonic waves in non-matching propagation direction after the interaction with the filter
20a first large-area one-dimensional photonic crystal having a first dispersion
20a second large-area one-dimensional photonic crystal having a second dispersion
25a dispersion ratio of a first one-dimensional crystal for forming a filter
25b dispersion ratio of a second one-dimensional crystal for forming a filter
26 dispersion ratio of a filter
30 direction-selective interferometric optical filter
31a reflective dielectric mirror layer/dielectric material layer
31b reflective dielectric mirror layer/dielectric material layer
31c reflective dielectric mirror layer/dielectric material layer
31d reflective dielectric mirror layer/dielectric material layer
32 first defect layer
33 spacer or substrate
34 second defect layer
35 substrate
36 first photonic structure
37 second photonic structure
38 first surface side
39 second surface side
40 plane of entry surface
41 outer surface of a structure
42 interface of the first photonic structure
43 interface of the second photonic structure
51 low-energy side band of the filter
52 blocking region
53 high-energy side band of the filter
60 specified filter mode of the filter
71 acceptance angular range
72 blind angular range/non-acceptance angular range
72a non-acceptance angle range
72b non-acceptance angle range
90 large-area photodetector
91 parallel light beam, which overlaps the filter mode in an energy range and propagates perpendicular to the filter surface
92a filter resonant photonic waves before the scattering process and before the interaction with the filter
92b filter resonant photonic waves after the scattering process and before the interaction with the filter
92c filter resonant photonic waves in non-matching propagation direction after the interaction with the filter
92d filter resonant photonic waves with matching propagation direction after the interaction with the filter
D thickness of a dielectric mirror/dielectric material layer
d thickness of a defect layer
$D_D$ thickness of the spacer or substrate/gap
A first beam path
B second beam path
C third beam path
f1 dispersion function
f2 dispersion function

The invention claimed is:

1. A direction-selective interferometric optical filter for spectrometric devices,
comprising at least:
an arrangement of two layered one-dimensional photonic structures,
wherein each of the two photonic structures contains a defect layer,
wherein each photonic structure has a dispersion function in an energy momentum space (E, $k_x$, $k_y$), wherein $k_x$ and $k_y$ represent momentum components of transmitted photons of the photonic structures for a specific energy (frequency/wavelength) E in the energy momentum space wherein both photonic structures have opposite interfaces which are at a plane-parallel distance from one another, wherein
dispersion functions of both photonic structures cross or intersect in the energy momentum space produce a cut set light rays of waves on the surfaces of the dispersion functions at a particular energy, and
wherein a light ray from the cut set contains waves selectively chosen through the filter at one angle, while other waves are reflected by the filter at other angles.

2. The filter according to claim 1, wherein,
in the plane parallel distance between the opposite interfaces, a layer-shaped spacer or a medium in the form of an air chamber or air cushion are located, which adjoin the interfaces, and wherein in the case of a gaseous medium the plane parallel distance between the interfaces of the photonic structures is set by spacers.

3. The filter according to claim 1, wherein the one-dimensional photonic structures each comprise at least two reflective mirror layers, wherein the at least two reflective mirror layers each comprise defect layer and comprises a spacer or medium, which connects the at least two reflective mirror layers plane parallel with a fixed distance apart and coherently decouples them, wherein a dispersion parabola induced by the two photonic structures for resonant modes in general satisfy $k_{x36}^2$ $k_{y36}^2$=const_1 and $k_{x37}^2$+$k_{x37}^2$=const_2, wherein the functions $k_{x36}^2$+$k_{y36}^2$=const_1 and $k_{x37}^2$+$k_{x37}^2$=const_2 for a selected energy yield an angular intersection region of paraboloid regions—an angular intersection region (equivalent to const_1=const_2), in which a beam path for waves incident at one angle comprises waves that are direction-selectively transmitted through the filter.

4. The filter according to claim 1,
further comprising:
at least one substrate in areal contact with at least one of the photonic structures.

5. The filter according to claim 1,
wherein
each layered one-dimensional photonic structure comprises at least two dielectric material layers arranged alternately and serving as reflective dielectric mirror layers, wherein the material layers have different dielectric properties over a whole operating range of the filter and, wherein the material layers have a thickness that induces an optical blocking region around a specified filter mode.

6. The filter according to claim 1,
wherein
at least one layered one-dimensional photonic structure comprises a photonic crystal with at least one said defect layer, which results in an amplification of a specified filter mode, and wherein the at least one said defect layer is located between two dielectric mirror layers, each with a specified refractive index.

7. The filter according to claim 6,
wherein both of the defect layers have either a fixed optical thickness or a variable optical thickness.

8. The filter according to claim 6,
wherein the defect layers within the two layered one-dimensional photonic structures have different refractive indices.

9. Filter according to claim 1,
wherein optical thicknesses of the defect layers within the two layered one-dimensional photonic structures have the same optical thickness, or differ by an integer multiple of a half-wavelength or have minor differences therefrom.

10. The filter according to claim 6,
wherein the defect layers comprise at least vacancies as defects.

11. The filter according to claim 2,
wherein the layer-shaped spacer between the two photonic structures is optically transparent in a resonant frequency condition of the direction-selective interferometric optical filter, and has an optical thickness larger or smaller than a coherence length of an incident light beam from a light source, which is analyzed by the filter.

12. The filter according to claim 11,
wherein the layer-shaped spacer has mechanical properties that ensure a defined mode of operation of the filter, and wherein the layer-shaped spacer is installed as a transparent substrate for both photonic structures, which are each attached on sides of the spacer.

13. The filter according to claim 4,
wherein the at least one substrate is optically transparent in a resonant frequency condition of a specified filter mode, at or according to which the direction-selective interferometric optical filter is produced or is attached.

14. A device having a direction-selective interferometric optical filter according to claim 1, and further comprising:
at least one light source and a detector, between which the direction-selective interferometric optical filter is arranged, wherein the direction-selective interferometric optical filter has at least resonant photonic waves for the filter in a matching propagation direction before interaction with the filter,
resonant photonic waves for the filter in a matching propagation direction after the interaction with the filter,
non-resonant photonic waves for the filter in a matching propagation direction before the interaction with the filter,
non-resonant photonic waves for the filter in a matching propagation direction after the interaction with the filter,
resonant photonic waves in a non-matching propagation direction before the interaction with the filter and
resonant photonic waves for the filter in a non-matching propagation direction after the interaction with the filter.

15. The device according to claim 14,
wherein
the photodetector and
the filter form a composite detector device,
wherein the filter is mounted either directly on a surface of the photodetector or is fixed on the photodetector, and wherein the filter is arranged between a photon-emitting medium and the photodetector.

* * * * *

UNITED STATES PATENT AND TRADEMARK OFFICE
CERTIFICATE OF CORRECTION

PATENT NO. : 10,036,839 B2
APPLICATION NO. : 15/517213
DATED : July 31, 2018
INVENTOR(S) : Langner et al.

Page 1 of 1

It is certified that error appears in the above-identified patent and that said Letters Patent is hereby corrected as shown below:

Column 14, Line 60: Claim 3, Delete "$k_{x36}^2\ k_{y36}^2 = \text{const\_1}$" and insert -- $k_{x36}^2 + k_{y36}^2 = \text{const\_1}$ --

Signed and Sealed this
Twenty-fifth Day of September, 2018

Andrei Iancu
*Director of the United States Patent and Trademark Office*